United States Patent
Zeng et al.

(10) Patent No.: US 9,846,851 B2
(45) Date of Patent: Dec. 19, 2017

(54) PRINT SERVICE PROVIDER CAPACITY PLANNING

(71) Applicants: Jun Zeng, Palo Alto, CA (US); Eric Hoarau, Palo Alto, CA (US); Sunil Kothari, Palo Alto, CA (US); Francisco Oblea, Tlaquepaque Jalisco (MX); Gary J Dispoto, Palo Alto, CA (US)

(72) Inventors: Jun Zeng, Palo Alto, CA (US); Eric Hoarau, Palo Alto, CA (US); Sunil Kothari, Palo Alto, CA (US); Francisco Oblea, Tlaquepaque Jalisco (MX); Gary J Dispoto, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 63 days.

(21) Appl. No.: 14/443,673

(22) PCT Filed: Jan. 15, 2013

(86) PCT No.: PCT/US2013/021607
§ 371 (c)(1),
(2) Date: May 19, 2015

(87) PCT Pub. No.: WO2014/112985
PCT Pub. Date: Jul. 24, 2014

(65) Prior Publication Data
US 2015/0363723 A1 Dec. 17, 2015

(51) Int. Cl.
*G06F 9/455* (2006.01)
*G06Q 10/06* (2012.01)

(52) U.S. Cl.
CPC ..... *G06Q 10/06313* (2013.01); *G06F 9/45558* (2013.01); *G06Q 10/06* (2013.01); *G06F 2009/45595* (2013.01)

(58) Field of Classification Search
None
See application file for complete search history.

(56) References Cited

U.S. PATENT DOCUMENTS 5,479,343 A * 12/1995 Matoba ............... G06Q 10/06 700/106
5,841,659 A * 11/1998 Tanaka ............... G06Q 10/06 700/121

(Continued)

FOREIGN PATENT DOCUMENTS

JP 2008-260286 A 10/2008
JP 2008260286 A * 10/2008 ......... G05B 19/0421

(Continued)

OTHER PUBLICATIONS

Eckart, Ben, et al. "Distributed virtual diskless checkpointing: A highly fault tolerant scheme for virtualized clusters." Parallel and Distributed Processing Symposium Workshops & PhD Forum (IPDPSW), 2012 IEEE 26th International. IEEE, 2012.*

(Continued)

*Primary Examiner* — Thomas L Mansfield
*Assistant Examiner* — Derick J Holzmacher
(74) *Attorney, Agent, or Firm* — Michael Dryja

(57) ABSTRACT

A user interface guides an interview of a print service provider (PSP) to generate interview data regarding the PSP. The interview data regarding the PSP is translated into simulation experiments regarding printing production services offerable by the PSP. The simulation results are concurrently executed to generate simulation results. The simulation results are synthesized to generate capacity plan- (Continued)

ning analyses and recommendations for the PSP reviewable within the user interface.

16 Claims, 6 Drawing Sheets

(56) References Cited

U.S. PATENT DOCUMENTS

| | | | | |
|---|---|---|---|---|
| 5,987,226 | A * | 11/1999 | Ishikawa | G06F 3/1293 358/1.13 |
| 6,003,069 | A * | 12/1999 | Cavill | G06F 3/1203 709/201 |
| 6,980,964 | B1 * | 12/2005 | Cocotis | G06Q 10/06315 358/1.1 |
| 8,255,508 | B2 * | 8/2012 | Kern | G06F 9/5077 709/223 |
| 8,464,268 | B2 * | 6/2013 | Zhou | G05B 19/41865 700/101 |
| 8,559,036 | B1 * | 10/2013 | Khafizova | G06F 3/1204 358/1.13 |
| 8,572,612 | B2 * | 10/2013 | Kern | G06F 9/5072 717/177 |
| 8,896,863 | B2 * | 11/2014 | Hu | G06Q 30/0202 358/1.15 |
| 2002/0124756 | A1 * | 9/2002 | Rai | G06F 3/1215 101/484 |
| 2002/0129081 | A1 * | 9/2002 | Rai | G06Q 10/10 718/102 |
| 2003/0149747 | A1 * | 8/2003 | Rai | H04L 29/06 709/219 |
| 2005/0162670 | A1 * | 7/2005 | Shuler, Jr. | H04N 1/00408 358/1.2 |
| 2006/0224440 | A1 * | 10/2006 | Rai | G06Q 10/06 718/102 |
| 2007/0091355 | A1 * | 4/2007 | Rai | G06Q 10/06 358/1.15 |
| 2007/0124182 | A1 * | 5/2007 | Rai | G06Q 10/06 705/7.38 |
| 2007/0247657 | A1 * | 10/2007 | Zhang | G06F 3/1208 358/1.15 |
| 2007/0247659 | A1 * | 10/2007 | Zhang | G06F 3/1208 358/1.15 |
| 2007/0283348 | A1 * | 12/2007 | White | G06F 9/4856 718/1 |
| 2007/0293981 | A1 * | 12/2007 | Rai | B07C 3/00 700/223 |
| 2008/0162625 | A1 * | 7/2008 | Sedayao | H04W 4/00 709/202 |
| 2008/0256541 | A1 * | 10/2008 | Rai | G06F 9/4843 718/101 |
| 2008/0285067 | A1 * | 11/2008 | Rai | G06Q 10/06 358/1.15 |
| 2009/0128856 | A1 * | 5/2009 | Rai | H04L 29/06 358/1.15 |
| 2009/0288084 | A1 * | 11/2009 | Astete | G06F 9/45533 718/1 |
| 2009/0303502 | A1 * | 12/2009 | Robinson | G06Q 10/06315 358/1.9 |
| 2010/0290079 | A1 * | 11/2010 | Rai | G06F 3/1211 358/1.15 |
| 2011/0002004 | A1 * | 1/2011 | Rai | G06F 3/1211 358/1.15 |
| 2012/0154846 | A1 * | 6/2012 | Hoarau | G06F 11/3072 358/1.14 |
| 2013/0111469 | A1 * | 5/2013 | B | G06F 3/1211 718/1 |
| 2013/0138816 | A1 * | 5/2013 | Kuo | G06F 9/5011 709/226 |
| 2015/0205888 | A1 * | 7/2015 | He | G06F 9/455 703/22 |

FOREIGN PATENT DOCUMENTS

| | | | | |
|---|---|---|---|---|
| WO | WO-2012044320 A1 * | 4/2012 | | G06F 3/1211 |
| WO | WO 2012128746 A1 * | 9/2012 | | G06F 3/1204 |
| WO | WO-2013028211 A1 * | 2/2013 | | G06Q 10/0631 |
| WO | WO 2013062535 A1 * | 5/2013 | | G06F 3/1208 |
| WO | WO-2013066298 A1 * | 5/2013 | | G06Q 10/0635 |
| WO | WO-2013119207 A1 * | 8/2013 | | G06Q 30/06 |
| WO | WO-2014084829 A1 * | 6/2014 | | G06Q 10/06398 |
| WO | WO-2014116419 A1 * | 7/2014 | | G06F 17/5009 |
| WO | WO-2015116114 A1 * | 8/2015 | | G06Q 10/10 |

OTHER PUBLICATIONS

Kothari, Sunil, et al. "Simulation as a cloud service for short-run high throughput industrial print production using a service broker architecture." Simulation modelling practice and theory 58 (2015): 115-139. (Year: 2015).*

Duan, Qing, et al. "Real-time production scheduler for digital-print-service providers based on a dynamic incremental evolutionary algorithm." IEEE Transactions on Automation Science and Engineering 12.2 (2015): 701-715. (Year: 2015).*

Zeng, Jun, et al. "Operations simulation of on-demand digital print." Conference Anthology, IEEE. IEEE, 2013. (Year: 2013).*

Zeng, Jun, et al. "On-demand digital print services: a new commercial print paradigm as an it service vertical." SRII Global Conference (SRII), 2011 Annual. IEEE, 2011. (Year: 2011).*

Huang, Wei, et al. "A case for high performance computing with virtual machines." Proceedings of the 20th annual international conference on Supercomputing. ACM, 2006. (Year: 2006).*

Kumar, Ranjan, and G. Sahoo. "Cloud computing simulation using CloudSim." arXiv preprint arXiv:1403.3253 (2014). (Year: 2014).*

"Headline News for the Last Week of Sep.", Sep. 26-30, 2011.

Kuehn, W. "Discrete Event Simulation of Networked Print Production", Apr 18, 2008.

Peck, P, et al. "Doing More with Less: Automating Print Productin Workflow", Jun. 30, 2009.

Watson, A.E., "More Control with Print MIS", May 2012.

* cited by examiner

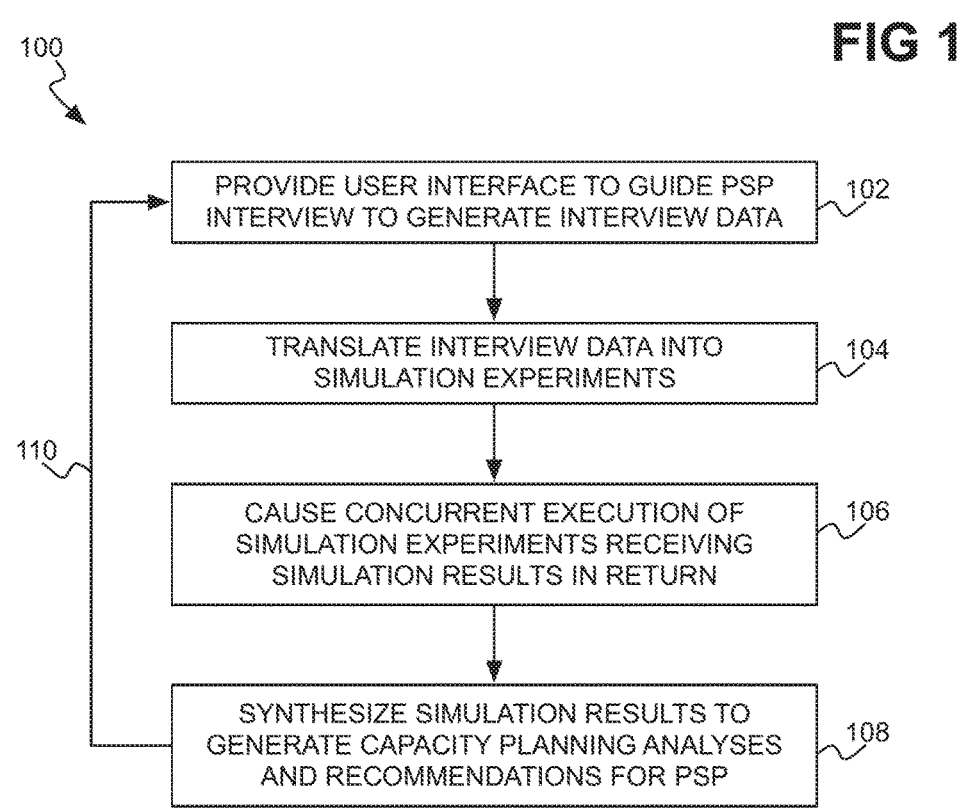

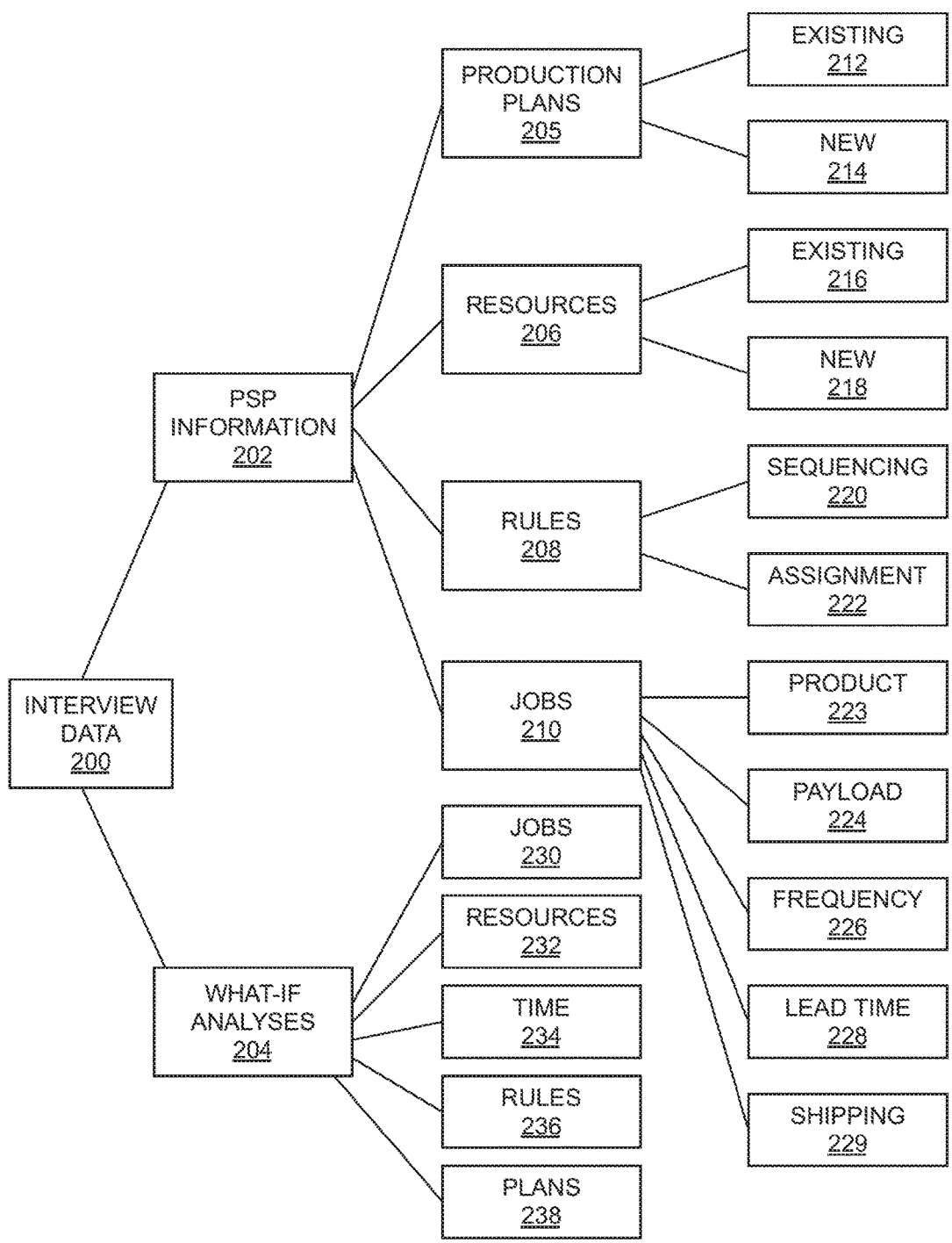

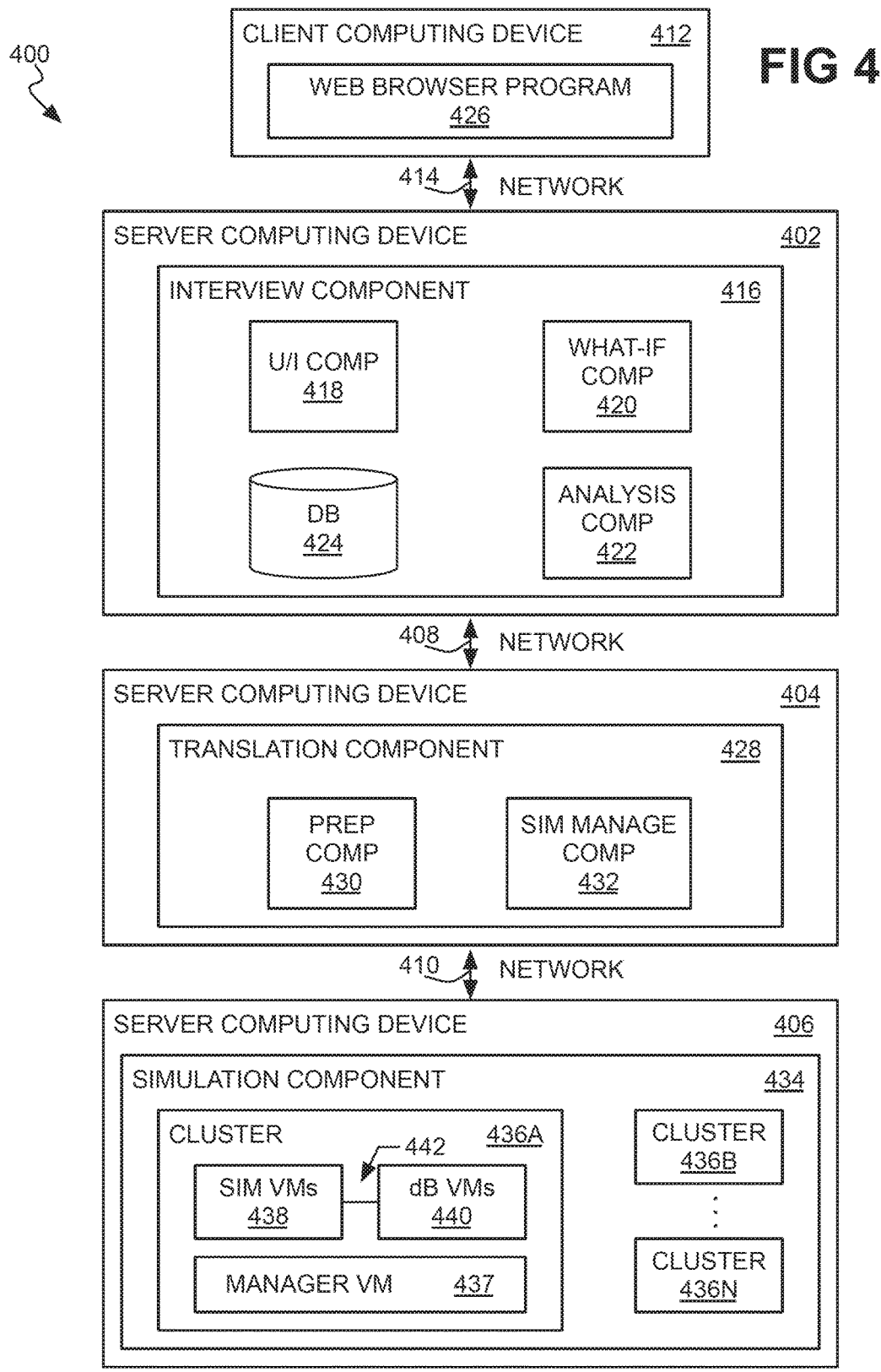

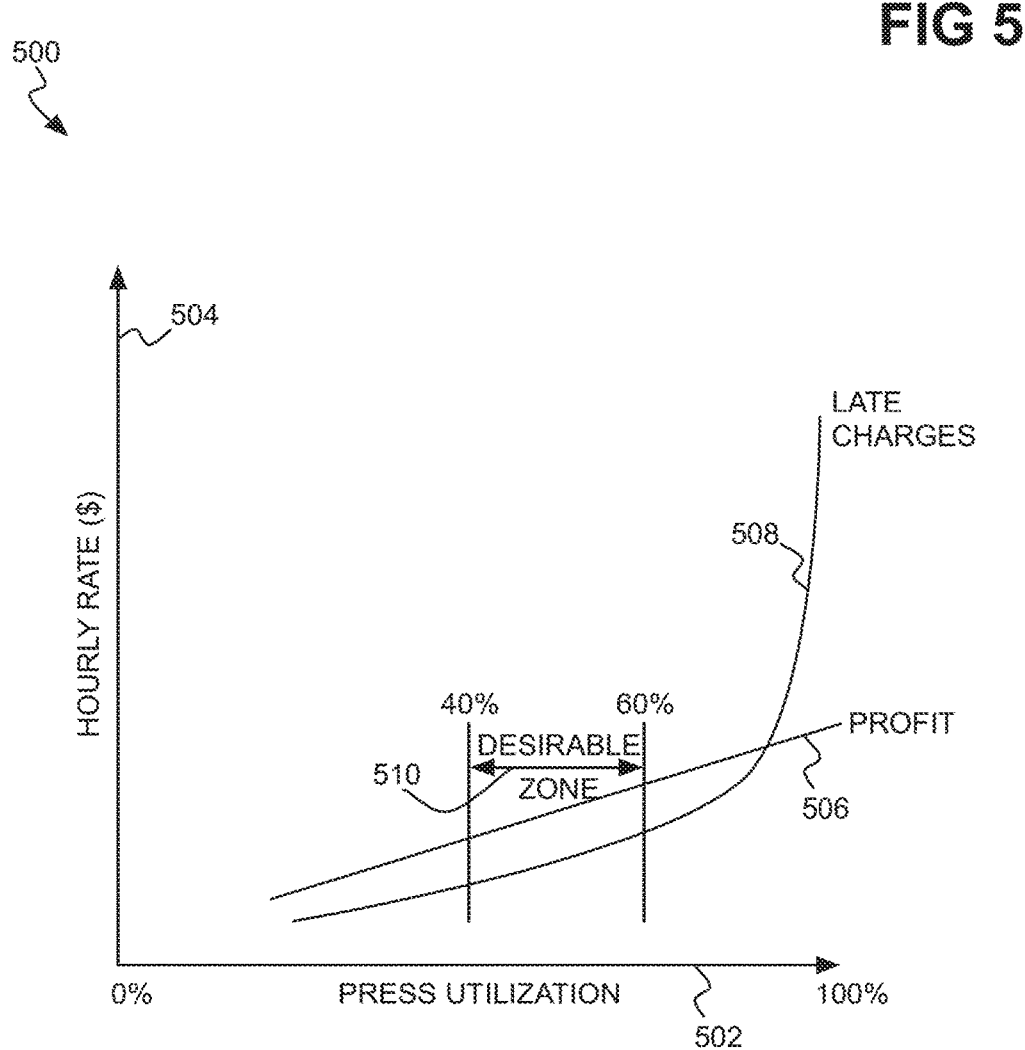

PRINT SERVICE PROVIDER CAPACITY PLANNING

BACKGROUND

Print service providers (PSPs) are businesses and other entities that offer print and print-related services to customers, such as other businesses as well as individuals. Customers may provide printing jobs in digital form, such as physically on a computer-readable storage medium or electronically over a network like the Internet, which the PSPs then print as the customers desire. PSPs provide customers with a greater variety of printing capabilities than the customers may themselves otherwise have, and save the customers from having to perform the upkeep on printing devices if the customers themselves had to manage this equipment.

PSPs thus fulfill the demand for traditional print services by printing varied materials, such as photographs and brochures, course materials and books, as well as advertisements, product packaging, and other types of print materials. In a typical PSP facility, printing manufacturing includes on-demand manufacturing, such as producing photo books responsive to customer orders. A characteristic of such an on-demand business is a tight linkage between customer demand and manufacturing activity.

BRIEF DESCRIPTION OF THE DRAWINGS

FIG. 1 is a flowchart of an example method for performing print service provider (PSP) capacity planning.

FIG. 2 is a diagram of example interview data obtained upon interviewing a PSP.

FIG. 4 is a diagram of an example system within which simulation experiments are executed.

FIG. 5 is a diagram of an example graph of capacity planning analyses and recommendations for a PSP.

DETAILED DESCRIPTION

Figure 3A:
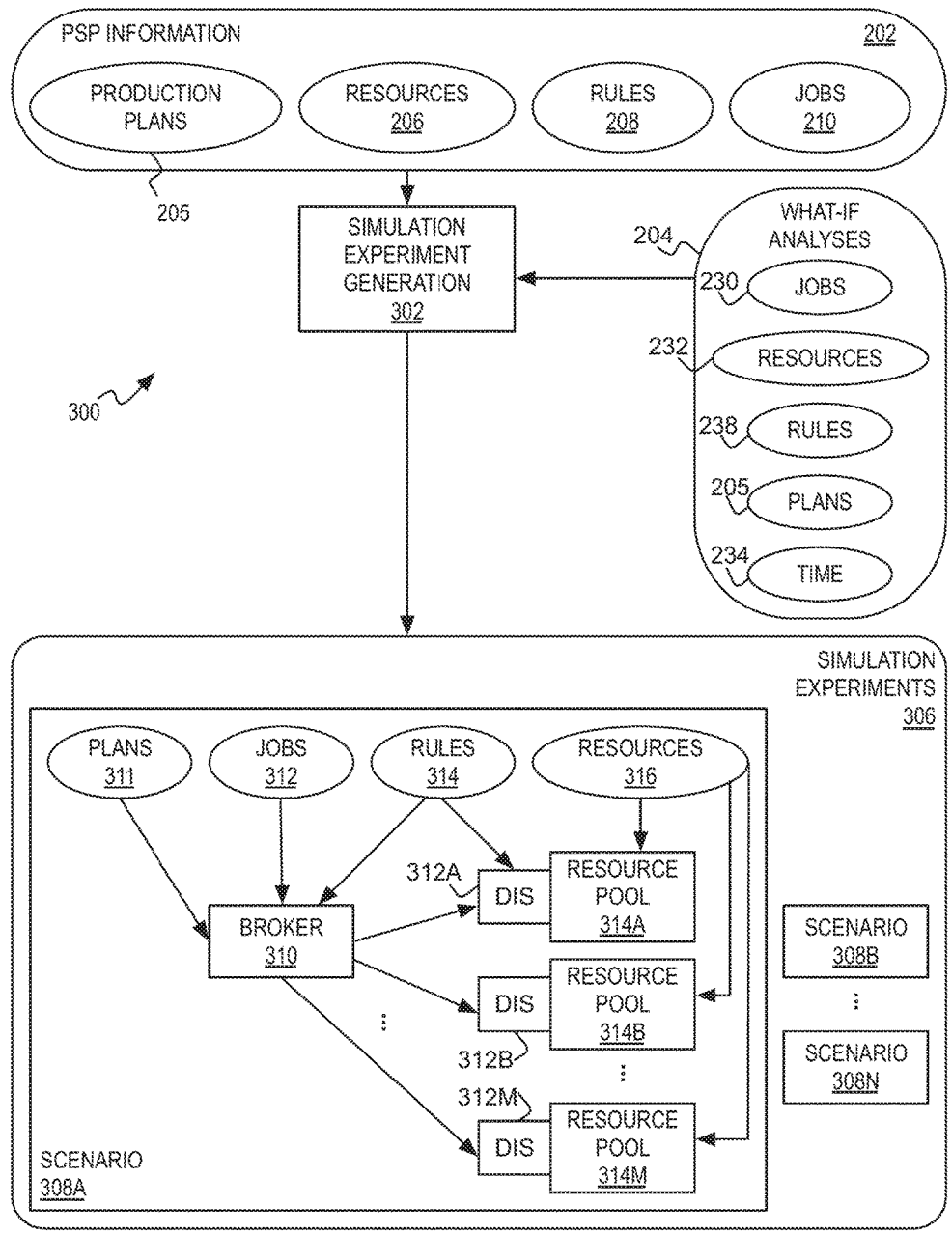
FIG. 3A is a diagram of an example process by which interview data is translated to simulation experiments.

As noted in the background, print service providers (PSPs) offer print and print-related services to customers. Many PSPs are smaller businesses that lack the ability to forecast their service level requirements going forward. As such, PSPs may postpone large capital equipment purchases, such as for digital printing presses, until they observe that production cannot sustain agreed-upon service levels. This issue is referred to as the lag-buying pattern. The lag-buying pattern can mean that PSPs incur late penalties with their customers, and may reduce their customer satisfaction.

Disclosed herein are techniques by which capacity planning can be provided for PSPs. A user interface guides an interview of a PSP to generate interview data regarding the PSP. This interview data is translated into simulation experiments regarding printing production services offerable by the PSP, and these simulation experiments are concurrently executed to generate simulation results. The simulation results are synthesized to generate capacity planning analyses and recommendations for the PSP that are reviewable within the user interface.

FIG. 1 shows an example method 100. The method 100 can be implemented as computer-executable code stored on computer-readable data storage medium and executable by one or more computing devices. For example, the method 100 may be implemented at a server computing device that a user interacts with via a client computing device over a network like the Internet, as well as at a standalone computing device having a computer program application running thereon. The user in question may be sales representative or other user of a supplier, such as a printing device manufacturer or reseller, for the PSP. The user thus can use a client computing device to work with a representative of the PSP onsite and provide relevant capacity planning analyses and recommendations for the PSP. The user may also be a representative of the PSP itself, such as a factory manager thereof. For example, a sales representative or other person may perform the initial setup, with the PSP representative thereafter using the client computing device. The management of the PSP may also use the method as an internal capacity planning and forecasting tool without engaging a sales representative or other user of a supplier.

The method 100 provides a user interface to guide an interview of the PSP to generate interview data regarding the PSP (102). The interview data desirably is the minimal amount of information to ensure that accurate and complete capacity planning analyses and recommendations can subsequently be generated on the basis of this interview data. That is, the user interface guides the interview so that just a minimal amount of relevant interview data is requested from the PSP, to minimize the length of time it takes to conduct the interview. Where a sales representative or other user of a supplier engages with a PSP representative, such minimal interview data is advantageous because the PSP may not wish for the interview to be overly intrusive and probing as to its internal business information. This interview data can include the PSP's printing production plans, its current printing resources and other related resources, such as non-printing sources like finishing and prepress resources as well as other factory equipment and human capital resources like workers, its operating rules for how the PSP fulfills printing jobs, as well as the types of printing jobs that the PSP fulfills. Such resources can also include consumable items, such as ink, toner, other types of colorant, substrate and other types of print media, as well as other accessories used to finish print products.

The user interface can further guide the interview in such a way as to conduct one or more what-if analyses with the PSP to further specify the interview data. For example, these what-if analyses can be employed to ensure that the interview data is accurate and germane. A representative of the PSP by answering questions presented during the what-if analyses may have his or her memory jogged as to how the PSP handles particular scenarios as to fulfilling customers' printing jobs using the PSP's current and desired printing and related non-printing resources. The interview data is said to include results of the what-if analyses, and is ultimately used to restrict the amount of processing that is performed to generate capacity planning analyses and recommendations for the PSP. The interview data may be obtained at least partially in other ways as well, such as by interacting with management information systems, enterprise resource planning systems, and other systems of the PSP.

The capacity planning intent of the PSP can also be assessed by the what-if analyses, on which basis the simulation experiments are generated, as described later in the detailed description. As one example, though, one type of what-if analysis is the PSP's estimate regarding demand trends. These demand trends include which types of current products may experience lower or higher demand, as well as new products that are likely to be requested. On the basis of such what-if analyses, appropriate simulation experiments can be generated for these demand trends. Other examples include potential resource purchases, new operation policies that the PSP is contemplating, and so on.

The method 100 translates the interview data into simulation experiments regarding production services offerable by the PSP (104), including current printing services that the PSP offers as well as printing services that the PSP would like to offer or plans to offer. Each simulation experiment can be considered as a unique process for handling the same or a different type of job. The translation process is generic and not specific to nor customized for the PSP, but rather is applicable to nearly any PSP if not all PSPs. In this way, the techniques disclosed herein provide a cost-effective tool for working with PSPs, insofar as they do not have to be customized for each different PSP.

Translating the interview data into simulation experiments includes simultaneous handling concurrent processes of multiple printing jobs of varying types, based on the interview data, and dynamically and reconfigurably reworking those processes that fail. A process for or of a printing job of a particular type is an ordered specification of the steps employed to fulfill the printing job, including the type of printing equipment used, for instance. Because a particular type of printing job can be fulfilled in multiple ways, different processes may be used for the same type of job. Such processes can and do fail, and translating the interview data into the simulation experiments ensures that recovery from failure is achieved. Furthermore, the user may have specified actions that are taken if a process fails. For instance, rules can be in place to handle subsequent rework actions for different types of failure modes, and a user can specify custom rules for failure model handling that supplement and/or overwrite such built-in rules.

The simulation experiments thus are a defined specification of the processes that a PSP does and may perform, based on the interview data obtained during the interview of the PSP. As such, rather than requesting that the PSP generate simulation models of these processes itself, which can be laborious and demand simulation expertise, the comparatively brief PSP interview generates interview data sufficient to ensure translation thereof into these processes. In this respect, it is noted that the results of the what-if analyses described above serve to restrict the scope and/or number of simulation experiments. For example, if a PSP does not intend to ever offer a particular type of service, then the simulation experiments can be restricted in scope and/or number to not include processes corresponding to this service.

The concurrent processes of multiple printing jobs of varying types can be considered concurrent workflows for such jobs. As such, translating the interview data into the simulation experiments is the generation of these concurrent workflows that can then be simulated. At least to ensure that different workloads can be compared to one another, these processes or workflows are analyzed to generate a workload estimate for each such workflow. The workload estimate for a workflow includes for each resource that can be used to fulfill the workflow, including both printing and non-printing resources, a quantum of work to be done by the resource in question. The workload estimates may themselves be normalized and become unitless, and thus have meaning insofar as they can be compared to one another. The estimates are unitless in that they are associated with an abstract work unit, based on which resource's performance is being defined.

The method 100 includes causing the concurrent execution of the simulation experiments (106), so that simulation results are received in return. A cluster of simulation engines and corresponding databases may be instantiated. Each simulation experiment is routed to an available simulation engine of a number of such simulation engines that run in parallel with one another. Each simulation engine is communicatively connected to a corresponding database that persistently stores information regarding printing processes that the simulation engine references in performing the simulation. Each simulation engine and each database can run on a different virtual machine (VM), such that it can be said that each simulation experiment is executed by two VMs. In another implementation, each simulation engine and each database can run on a different physical machine, or computing device. In yet another implementation, the simulation engines and the databases can run on the same computing device, such as in the context of a computer program application running on a standalone computing device like a desktop or laptop computer.

The VMs may by implemented on one or more different computing devices, which are referred to herein as simulation computing devices. The simulation computing devices and hence the VMs are accessible to the computing device performing the method 100 over a network. The simulation engines are controlled by the computing device performing the method 100. In these respects, the concurrent simulation of the simulation experiments can occur in a massively parallel manner over a network cloud, such that different performances of the method 100 can be performed concurrently with little or no performance degradation, so long as there are sufficient simulation computing devices available. In this respect, there can be redundancy in the number of simulation computing devices available to ensure that there are sufficient computing devices available.

The method 100 as part of part 106 receives simulation results for each simulation experiment from a corresponding simulation engine. These simulation results can include, for instance, the type of printing hardware used to realize the simulation experiment (i.e., a printing job process or workflow) in question, and how long using such hardware takes to complete this process or workflow. The simulation results can also include, for example, the cost incurred to realize the printing job process or workflow in question, such as general manufacturing cost, capital equipment cost, associated labor cost, material cost, and so on. The simulation results can further include pricing, to permit the determination of profits, profit margins, returns on capital investments, and so on. The printing hardware can include both the existing hardware of the PSP in relation to which the method 100 is being performed, as well as potential hardware for the PSP to procure.

Once the simulation experiments have been completed, and simulation results received for the experiments, the results are synthesized to generate capacity planning analyses and recommendations for the PSP (108). The user under whose direction the method 100 is being performed can thus review these analyses and recommendations with a representative of the PSP. In another use case, a PSP manager can review these analyses and recommendations for internal capacity planning and forecasting. This review can be achieved in the context of and within the user interface in which the initial interview of the PSP was guided in part 102.

Synthesis of the simulation experiments into capacity planning analyses and recommendations for the PSP includes providing analyses as to the current and potential future usage rates of printing hardware of the PSP, and the corresponding profitability of the PSP. The synthesis includes providing recommendations as to what printing hardware the PSP should consider procuring to achieve desired future usage rates and corresponding profitability. For example, one or more graphs may be presented within the user interface provided by the computing device running the method 100. The user under whose behest the method 100 is being performed can explain these graphs to the representative of the PSP, so that an informed decision can be made by the PSP as to which printing equipment should be purchased, and when, to meet future demand trends and to ensure desired levels of profitability.

The process of the method 100 is iterative via a feedback loop 110. For instance, if the representative of the PSP does not accept the recommendations provided in part 108, then he or she can make changes via changing some of the PSP interview data. This is achieved by repeating at least partially the method 100 at part 102. As such, the feedback loop 110 ensures that the analyses and the recommendations that are ultimately provided and accepted are aligned with the PSP's expectations.

Each part 102, 104, 106, and 108 of the method 100 is now described in detail with reference to a corresponding figure. For part 102, FIG. 2 shows example interview data 200 that may be obtained from the PSP. The interview data 200 includes information 202 regarding the PSP, as well as results 204 of what-if analyses. The PSP information 202 novelly includes the minimal amount of information regarding the PSP on which basis simulation experiments can be run to generate accurate capacity planning analyses and recommendations for the PSP. This ensures that the time of the PSP is not wasted during the interview process collecting unnecessary information, for instance.

Specifically, the PSP information 202 includes production plans 205 of the PSP, existing printing and related non-printing resources 206 of the PSP, operating rules 208 to which the PSP ascribes, and types of printing jobs 210 that the PSP processes. The production plans 205 can each be in the form of a directed graph. The graph for a production plan 205 may depict the normal process for effectuating this plan 205; edges within the may then branch out to other repair or remake processes when the plan 205 in question fails. The production plans 205 can be selected from existing production plans 212 that have been saved in a database in templatized fashion, and can also be built to include new production plans 214 that are not present in the database.

Because many PSPs have similar production plans 205, being able to access existing production plans 212 within a prepopulated database ensures that the interview process is conducted quickly. For any new production plans 214 that are not yet within the database, such plans 214 can be built within the interview process and later saved in templatized form in the database, if desired. It is noted that capacity planning can be considered as optimizing production plans 205, among multiple different ways of manufacturing the same product in question given current resources, and workload and service level requirements.

Constructing new production plans 214 may be achieved within the user interface provided by part 102 by permitting the user to instantiate new nodes and to link these nodes. To ensure robustness without undue complexity, a limited number types of nodes may be permitted: a root node having just outgoing edges, a two-way fork node, a two-way join node, and a node having one incoming edge and one outgoing edge. The nodes correspond to actions performed by the PSP, whereas the edges indicate precedence constraints for these actions. That is, each node corresponds to a process step. Some process steps are non-physical in nature, taking as input electronic data and transforming it into other electronic data, as is the case with raster image processing (RIP). Other process steps take as input a physical part and transform this part into a desired output part. These types of process steps may use labor and/or equipment or tooling. This transformation takes a given amount of time and incurs a given amount of cost. Furthermore, the transformation may fail if the output part does not satisfy a desired quality level.

Each production plan, including each existing production plan 214 and each new production plan 216, may be for or specify a particular product, and specify the manner by which an order for this product is fulfilled. In this respect, the manner by which the product in question is fulfilled is the directed graph that represents the production plan. That is, a production plan is particular to a specific product, and is also particular to a specific manner by which an order for the product is fulfilled.

The existing printing and related non-printing resources 206 of the PSP can be specified from existing resources 216 that have been saved in the database in templatized fashion. New printing and related non-printing resources 218 can also be specified during the interview process, which may be later saved in templatized form in the database, if desired. Many PSPs have similar printing and/or related non-printing resources 206, such that being able to retrieve existing resources 216 within a prepopulated database ensures that the interview process is conducted quickly.

For each resource 206, different parameters are specified, including the type of the resource, the type of printing process that this resource can fulfill, typical setup time of the resource, typical unit speed of the resource, typical unit process time of the resource (e.g., cost per sheet printed), typical failure rate of the resource, and typical availability of the resource. Other parameters include operating cost when the resource is currently being used, and operating cost when the resource is sitting idle. The operating cost in each such case can include the cost of power, the cost of real estate to house the resource, and so on. This information is saved for each existing resource 216 within the database. To instantiate an existing resource 216 as one of the PSP's resources 206, the user just has to the quantity that the PSP has of the resource 216 in question, although the user may also be able to modify any of the presaved parameters. For a new resource 218 that are not present in the database, by comparison, the user has to specify the parameters for this resource 218.

The operating rules 208 of the PSP include sequencing rules 220 and assignment rules 222, which may be retrieved from the database or manually specified. The sequencing rules 220 specify how printing jobs are sequenced for fulfillment by the PSP, and thus determine the production priority among the list of printing jobs to be fulfilled. For instance, such sequencing rules 220 can include earliest due date (EDO) ordering, first-in-first-out ordering (FIFO), and minimum processing time ordering, among other types. The sequencing rules further can be generated using an embedded optimization engine. The assignment rules 222 specify how printing and related non-printing resources are assigned to printing jobs. For instance, such assignment rules 222 can include round-robin methodology, in which the resources are assigned in a round-robin manner, as well as shortest work-in-process methodology, such that the resource that has the shortest work-in-process and that can fulfill a particular printing job is assigned to this printing job. Other production scheduling methodologies include using a constrained optimization engine, such as a genetic algorithm that can output an optimal sequencing and resource assignment simultaneously.

The printing jobs 210 of the PSP specify the different types of printing jobs that the PSP handles or would like to handle. For each such printing job 210, example parameters include: product type 223, typical workload type 224, typical frequency type 226, typical lead-time type 228, and shipping details 229, among other parameters or attributes. For example, other such attributes including substrate requirements or preferences, pricing, and so on.

The product type 223 of a printing job 210 specifies the kind of end product that performing the job 210 generates. The typical workload type 224 of a printing job 210 specifies how large instances of such jobs typically are, in terms of time, number of pages, or in a different manner. The typical frequency type 226 of a printing job 210 indicates how often instances of such jobs are typically encountered (i.e., ordered by customers). The typical lead-time type 228 indicates how soon instances of such jobs typically must be fulfilled as specified by customers. For example, ordered books have to be printed, bound, and shipped to prespecified addresses.

The types 224, 226, and 228 may be specified as distributions, such as Gaussian and Poisson distributions, for instance. As an example, if the workload type 224 is specified as being Gaussian, this means that how large instances of the corresponding printing job 210 are ascribes to a Gaussian distribution. As another example, if the frequency type 226 is specified as being Poisson, this means that how frequent instances of the corresponding job 210 are encountered ascribes to a Poisson distribution. Other types of statistical distributions can also be employed, as well as probability density functions. Furthermore, the information can in one implementation be loaded directly from a customer's job database, such as an enterprise resource planning database, without employing any type of statistical profiling.

The shipping details 229 can include information regarding the shipment of a corresponding printing job 210 once the job 210 has been completed. As noted above, for instance, ordered books may have to be shipped to pre-specified addresses once they are printed and bound. The shipping details 229 can include the carrier to be used, how quickly the products in question are to arrive, as well as other types of such shipping-oriented information. The shipping details 229 can further include different shipping options, each of which may have a different cost and delivery time, for instance.

Once the PSP information 202 has been entered, various what-if analyses can be performed to provide corresponding what-if analyses results 204. The what-if analyses are performed to better delineate how the PSP is planning its business and operations going forward. The analyses results 204 thus ultimately serve to provide direction to the simulation experiments that are translated from the interview data 200, to effectively restrict or reduce the number and/or scope of such simulation experiments that are performed.

One or more of at least five types of what-if analyses may be performed: jobs analyses 230, resources analyses 232, time analyses 234, operating policy rules analyses 236, and production plans analyses 238. It is noted that the analyses 230, 232, 236, and 238 correspond to the jobs 210, resources 206, rules 208, and plans 205 of the PSP information 202, respectively. As such, the PSP information 202 can be considered as the current information of the PSP, and the what-if analyses results 204 can be considered as potential future information of the PSP. The time analyses 234 impacts each of the other what-if analyses 230, 232, 236, and 238, insofar as the time analyses 234 provides a time horizon or component of the other analyses 230, 232, 236, and 238.

The jobs analyses 230 include modifying the workload types, frequency types, and lead-time types of one or more print jobs 210. For example, the user can specify such information as what would result from a capacity planning perspective if a printing job 210 were to have a different workload type, frequency type, or lead time type. In this respect, the jobs analyses 230 serve to specify the types of capacity planning in which the PSP is interested from a printing job perspective. If a given jobs analysis 230 is not indicated, then this can mean that the PSP is not fulfilling and does not anticipating fulfilling this type of job, and as such the simulation experiments that are subsequently generated are accordingly restricted in number and/or in scope.

The resources analyses 232 include modifying the parameters of one or more printing and/or related non-printing resources 206. For example, the user can specify such information as what result from a capacity planning perspective if a resource 206 were to be of a different type, could fulfill a different type of printing process, have a different setup time and/or unit speed, have a different failure rate, and/or have a different in-use and/or idle operating cost. If a given resources analysis 232 is not indicated, then this can mean that the PSP does not have this type of resource active and does not anticipate acquiring this type of resource, and as such the simulation experiments that are subsequently generated are accordingly restricted in number and/or in scope.

The time analyses 234 include specifying the time horizon for which capacity planning is to be performed. A PSP may be primarily interested in the printing equipment it should procure over the next calendar year, for instance, but may also be interested in such capacity planning over the subsequent two or three years as well. Beyond this time horizon, the PSP may not be interested in capacity planning. Therefore, the time analyses 234 affects the simulation experiments that are subsequently generated in number and/or in scope, because simulation experiments pertaining to capacity planning beyond the specified time horizon are not generated.

The operating policy rules analyses 236 include specifying different policy aspects of the PSP that are operational in nature. For example, these policy aspects can include optimal shifts for workers and/or equipment, optimal sequencing of jobs, and optimal resource assignment. The production plans analyses 238 can include the different ways in which a given product can be made, such as under the same current constraints in terms of workload and resources. Such analyses 238 can provide insight into optimal profit and quality of service regarding the PSP.

For the translation performed in part 104 of the method 100, FIG. 3A shows an example process 300 by which the interview data 200 of FIG. 2, specifically the PSP information 202 and the what-if analyses results 204, are used to generate simulation experiments 306. A simulation experiment generation block 302 represents the processing that is performed on the basis of the PSP information 202 and the what-if analyses results 204 to generate the simulation experiments 306. Further information regarding a service broker block 310 thereof is also described in more detail later in the detailed description in relation to FIG. 3B. The blocks described herein can each be implemented as software running on one or more computing devices.

The PSP information 202 includes the plans 205, the resources 206, the rules 208, and the jobs 210 of FIG. 2, and the what-if analyses results 204 similarly include the results of the plans analyses 238, the resources analyses 232, the rules analyses 236, and the jobs analyses 230 of FIG. 2. In this respect, then, in one example implementation there can be four dimensions of data; plan, resource, rule, and job, although in other example implementations, there can be more or fewer data dimensions, and/or the data dimensions may include others in addition to and/or in lieu of plan, resource, rule, and job. The simulation experiments 306 includes one or more simulation experiments for each of a number of scenarios 308A, 308B, . . . , 308N, which are collectively referred to as the scenarios 308. Each scenario 308 represents a unique combination of these four dimensions of data. The times analyses 234 are also part of the what-if analyses 204 considered by the simulation experiment generation block 302, but is not explicitly considered a dimension of data. This is because, as noted above, the time analyses 234 impacts each of the other what-if analyses 230, 232, 236, and 238, insofar as the time analyses 234 provides a time horizon or component of the other analyses 230, 232, 236, and 238.

For example, a given plan—be it an existing plan 205 of the PSP information 202 or a plan resulting from results of the what-if plans analyses 238—can be fulfilled by one or more resources by following one or more rules for one or more printing jobs. Thus, the simulation experiment generation block 302 generates scenarios 308 corresponding to plausible unique combinations of the four dimensions of data. Some combinations are not feasible—or are unnecessary—and therefore are not generated, or are discarded after being generated. For example, a color printing job is unable to be fulfilled using a set of resources that do not include at least one color printing device, and therefore a set of resources that does not include at least one color printing device is not part of any corresponding scenario 308. As another example, a printing job that does not result in binding of printed pages does not use binding equipment, and therefore no binding-related resource is included as part of any corresponding scenario 308.

The four dimensions of the PSP information 202 and the what-if analyses results 204 are used to generate simulation experiments 306 for each scenario 308 as representatively depicted in FIG. 3A in relation to the scenario 308A. The four dimensions include dimensions corresponding to plans 311, jobs 312, rules 314, and resources 316. The plans 311 include one or more of the plans 205 of the PSP information 202 and/or one or more of the results of the plan analyses 238 of the what-if analyses results 204. The jobs 312 include one or more of the jobs 210 of the PSP information 202 and/or one or more of the results of the jobs analyses 230 of the what-if analyses results 204. The rules 314 include one or more of the rules 208 of the PSP information 202 and/or one or more of the results of the rules analyses 236 of the what-if analyses results 204. The resources 316 include one or more of the resources 206 of the PSP information 202 and/or one or more of the resources analyses 232 of the what-if analyses results 204.

The service broker block 310 for a job 312 of the scenario 308A generates an ordered list of tasks to be performed to fulfill the job 312, according to a production plan 311 of the scenario 308A, and prioritizes the job 312 according to the rules 314. The resources 316 of the scenario 308A are divided by common task type into resource pools 314A, 314B, . . . , 314M, which are collectively referred to as the resource pools 314. For example, there may be a resource pool 314 encompassing the resources 316 that perform color printing, a resource pool 314 encompassing the resources 316 that perform binding, and so on.

The resource pools 314 have corresponding dispatchers 312A, 312B, . . . , 312M, which are collectively referred to as the dispatchers 312. Each dispatcher 312 receives the tasks from the service broker block 310 that correspond to the task type of the resources 316 within its associated resource pool 314A. For example, if the resource pool 314A includes color printing devices, then the corresponding dispatcher 312A receives the tasks from the service broker block 310 that relate to color printing.

A dispatcher 312 assigns the tasks provided by the service broker block 310 to the resources 316 assigned to its associated resource pool 314 as dictated by the relevant rules 314 for this task. For example, the rules 314 can specify the priority in which tasks are to be assigned to the resources 316, as well as to which of the resources 316 that are to be assigned. Because each resource 316 can have an operating cost and processing speed, the rules 314 can denote whether a task should be assigned to a lower cost but slower resource 316 or a higher cost but faster resource, for instance.

A simulation experiment 306 is thus generated for each scenario 308. A simulation experiment 308 is a particular instantiation of the data dimensions corresponding to the plans 311, the jobs 312, the rules 314, and the resources 316. In this respect, then, a simulation experiment 308 can be considered as a particular virtualization of the PSP's factory with existing or potential resources 316, to process a given type of job 312 according to a given type of plan 311 by following particular rules 314, over a simulated production period.

A simulation experiment 308 therefore includes a simulated customer submitting orders to the PSP, in accordance with the jobs 312. These simulated jobs are analyzed by the service broker 310 to generate a lists of tasks, and the fulfillment of the tasks by the resources 316 is simulated. The service broker 310 thus can be considered as a factory manager, and is part of the simulation experiment 308 insofar as it instantiates a print job from the descriptions of the jobs 312 and breaks this print job into tasks.

A simulation experiment 308 thus quantifies the impact of work yield based on changes in equipment, in demand, and so on. A simulation experiment 308 captures the impact of such changes in the four data dimensions corresponding to the plans 311, the jobs 312, the rules 314, and the resources 316. As noted above, the what-if analyses results 204 are used to restrict the generation of the simulation experiments 308 so that just meaningful experiments 308 are generated (or so unmeaningful experiments 308 are discarded after being generated and prior to being simulated). That is, a simulation experiment 308 corresponding to every combination of the four data dimensions is not simulated, since many such experiments 308 may correspond to combinations that the PSP is uninterested in, for instance.

Figure 3B:
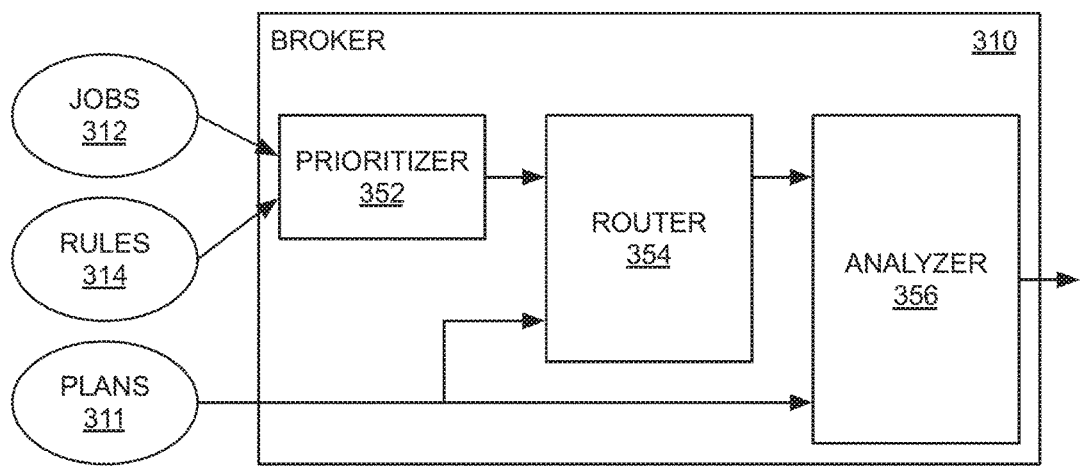
FIG. 3B is a diagram depicting example workload analysis that can be performed within the translation process of FIG. 3A.

FIG. 3B shows an example of the service broker block 310 of FIG. 3B in more detail. The jobs 312 are input into a job prioritizer block 352. The job prioritizer block 352 prioritizes the jobs 312, specifically sorting them in the order in which they are to be completed, according to the rules 314. The sorted list of jobs 312 is input into a task router block 354, into which the plans 311 are also input. The task router block 354 divides each job 312 into tasks, or workloads, in accordance with one or more of the plans 311. The task router block 354 further assigns each task, or workload, with the type of resource 316 that is operable thereon, as dictated by the plans 311 input into the block 354. The various tasks, or workloads, are then input into a workload analyzer block 356. It is noted that the tasks are dispatched concurrently to the extent possible.

The workload analyzer block 356 analyzes each task, or workload, and assigns each task with a unitless payload value. The payload value for a task is a number corresponding to the amount or extent of the corresponding workload to be fulfilled by one of the resources 316. Although the payload values are unitless, the values are comparable for similar tasks. For example, for a cutting resource 316, tasks that can be fulfilled by this resource 316 may have payload values corresponding to the number of sheets to be cut. As another example, for a color printing resource 316, tasks that can be fulfilled by this resource 316 may have payload values corresponding to the number and/or the complexity of the pages to be printed. For instance, the work to fulfill color printing tasks can be derived from the size of the page, image coverage, dots per inch of ink or other colorant to be printed, and other parameters.

The payload value is used by the dispatchers 312 to assist them in assigning the tasks to the resources 316 of their resource pools 314. For example, for two tasks of a particular type, a corresponding dispatcher 312 may determine which task will require more time to fulfill as the task that has a greater payload value. In this way, the dispatchers 312 themselves do not have to spend an inordinate amount of processing time to determine how to compare otherwise disparate tasks for resource assignment purposes, but can instead simply compare the payload values of these tasks.

The workload analyzer block 356 outputs an ordered list of tasks, where each task has a task type that indicates to which dispatcher 312 it should be routed, as well as a payload value. The workload analyzer block 356 is able to order the tasks within the list, due to the input of the production plans 311, which indicate how the tasks of a particular job are to be ordered in order to be fulfilled. The service broker block 310 as a whole thus serves to prioritize jobs 312, divide each job 312 into an ordered list of tasks in accordance with the plans 311, and for the tasks of the jobs 312 as a group, sort them into an ordered list of tasks with corresponding payload values.

For the simulation causation part 106 of the method 100 of FIG. 1, FIG. 4 shows an example system 400 that implements the method 100 as a whole, and which is particularly illustrative in depicting how simulation of the simulation experiments 306 of FIG. 3 occurs. The example system 400 includes at least one server computing device 402, at least one server computing device 404, and multiple simulation computing devices 406. The server computing device 402 and the server computing device 404 may be the same server computing device, and together perform the method 100. By comparison, the simulation computing devices 406 are separate computing devices. It is noted that in other example systems 400, the computing devices 402, 404, 406, and/or 412 may be the same computing device, particularly in the implementation in which the method 100 is implemented using a standalone computing device like a desktop or laptop computer.

In the example of FIG. 4, the server computing device 402 and the server computing device 404, when separate computing devices, communicate with one another over a network 408. Similarly, the server computing device 404 communicates with the simulation computing devices 406 over a network 410, which may be the same or a different network as the network 408. The server computing device 402 also communicates with a client computing device 412 over a network 414, and the client computing device 412 is a separate computing device from the computing devices 402, 404, and 406. The network 414 may be the same or a different network as either or both of the networks 408 and 414.

The computing devices 402, 404, 406, and 412 include hardware, such as a processor, memory, and computer-readable data storage medium, via which software is executable. The networks 408, 410, and 414 can each be or include a variety of different networks. Examples of such networks include the Internet, an intranet, an extranet, a local-area network, a wide-area network, a telephony network, a cellular data network, and so on.

The server computing device 402 implements an interview component 416, which can be software running on the hardware of server computing device 402. As such, the server computing device 402 can be considered an interview server computing device that performs part 102 of the method 100 of FIG. 1. The interview component 416 includes a user interface component 418 that provides a user interface by which the interview data 200 of FIG. 2 generally and the PSP information 202 of FIG. 2 more specifically are obtained. The interview component 416 includes a what-if analysis component 420 that performs the what-if analyses in concert with the user interface component 418 to obtain the what-if analyses results 204 of FIG. 2. The interview component includes an analysis component 422 that generates the capacity planning and recommendations in part 108 of the method 100, which are then presented via the user interface of the user interface component 418. The database 424 stores the information acquired by and presented by the user interface component 418.

The database 424 may store information for both a particular PSP as well as information that is applicable to more than one PSP. Such information can be organized over a number of catalogs, including a resource catalog, a product catalog, and a process catalog. The resource catalog includes information regarding equipment performance and cost. The product catalog includes information regarding workflows, and the process catalog includes information regarding manufacturing steps.

The user interface that the user interface component 418 presents can be displayed to a user operating a web browser program 426 running on the client computing device 412. For example, the user may be a salesperson or consultant for a printing hardware manufacturer who has brought his or her laptop, as the client computing device 412, onsite to a PSP at which the user interviews a representative of the PSP. In such an implementation, the client computing device 412 acts as a frontend for processing performed at a backend made up of the server computing devices 402 and 404 and the simulation computing devices 406.

The interview data 200 of FIG. 2 is passed over the network 408 from the interview server computing device 402 to the server computing device 404, which implements a translation component 428 that can be software running on the hardware thereof. As such, the sever computing device 404 can be considered a translation server computing device that performs part 104 of the method 100 of FIG. 1, and that also performs part 106 of the method 100. The translation component 428 includes a preparation component 430 that performs the actual translation of the interview data 200 into the simulation experiments 306 of FIG. 3 in part 104, as described. The translation component 428 also includes a simulation management component 432 that initiates and manages execution or performance of the simulation experiments 306, and thus which performs part 106 of the method 100, by appropriately directing the simulation computing devices 406 as is now described.

For the set of simulation experiments 306 of FIG. 3 as a whole, the simulation management component 432 instantiates a duster. At any given time, there can be one or more dusters 436A, 436B, . . . , 436N, which are collectively referred to as the dusters 436, and which are considered together as the simulation component 434 that the simulation computing devices 406 implement. The simulation component 434 can be software running on the hardware of the simulation computing devices 406. Because multiple dusters 436 can be instantiated, different sets of simulation experiments for different PSPs based on different interview data collected by different users can be concurrently simulated. In this respect, the simulation computing devices 406 form a massively parallel simulation cloud. Further, it is noted that in one implementation, each simulation cluster 436 corresponds to a different PSP, such that within a given cluster 436 there are multiple simulation experiments running concurrently on this cluster 436, where each experiment corresponds to a different scenario of the same PSP.

The cluster 436A is described as representative of the clusters 436. The cluster 436A includes a manager VM 437, which may also be referred to as a gateway VM. For each simulation experiment 306 of the method 300, the manager VM 437 of the simulation component 434 instantiates a pair of VMs 442. The pair of VMs 442 includes a simulation VM 438 and a database VM 440. Each such pair of VMs executes separately and concurrently on the simulation computing devices 406. Therefore, the simulation experiments 306 are concurrently executed, in concurrence with the concurrent execution of any other set of simulation experiments on any other cluster. The manager VM 437 acts or serves as the gateway in that input to and output from each pair of VMs 442 occurs through the manager VM 437 in one implementation.

The simulation VM 438 of a pair of VMs 442 interacts with its corresponding database VM 440 of the same pair of VMs 442 to perform simulation of a simulation experiment 306 of the method 300 assigned to the pair of VMs 442. Each simulation experiment can be considered as corresponding to a different scenario of the PSP, as has been described above. The simulation VM 438 performs the actual simulation of the simulation experiment 306, accessing and storing data as needed on a database hosted by the corresponding database VM 440.

Specifically, the simulation VM 438 runs a simulation engine, and the database VM 440 hosts a database. In one implementation, the simulation engine may be a version of a virtual print factory simulation engine, as described in the journal article J. Zeng, et al., "Productivity Analysis of Print Service Providers," Journal of Imaging Science and Technology, volume 54, number 6, year 2010. In one implementation, the database may be the MySQL™ database available from Oracle Corporation of Redwood City, Calif.

The simulation engine of a simulation VM 438 running a simulation experiment 306 of FIG. 3 in conjunction with a corresponding database VM 440 ultimately generates simulation results that are reported back to the simulation management component 432 of the translation component 428. The simulation component 434 may deinstantiate the pair of VMs 442, and the corresponding resources returned to a resource pool, once its assigned simulation experiment 306 has been executed. When no more simulation experiments 306 are being run within the cluster 442, the simulation management component 432 deinstantiates the cluster 442. In this way, the hardware resources of the simulation computing devices 406 are leveraged as needed to execute simulation experiments.

As such, the simulation management component 432 can in one implementation analyze factory baseline data for a PSP, as well as answers to the what-if questions, and generate multiple scenarios covering possible meaningful combinations of demand trends and possible resources. Each scenario includes the data to simulate the production of a set of products using a set of key resources. Performance metrics generated by each scenario include lead time, resource utilization, production cost, revenue, profit, and service level. These scenarios are grouped together to form a simulation cluster 436, and are executed concurrently to ensure quick results delivery. Each cluster 436 includes multiple VMs over three tiers. One tier includes the manager VM 437, whereas the other two tiers include the simulation VM 438 and the database VM 440 for each scenario. The manager VM 437 ensures the scenarios are analyzed and synthesized together, and each scenario includes one simulation VM 438 and one database VM 440. The simulation VM 438 reads input data from and writes output data to its corresponding database VM 440.

The simulation management component 432 thus manages the deployment of a simulation cluster 436 by generating the VMs 437, 438, and 442 on demand using a VM image for each. The management component 432 monitors the progress of the simulations being conducted within the duster 436 as well as the health of the VMs 437, 438, and 442 therein. The component 432 terminates the VMs 437, 438, and 442—and thus terminates the duster 436—once the simulations have been completed and an analysis report generated. Overprovisioning of resources within the server computing device 406 (and/or the number of such devices 406) can be provided to ensure that sufficient resources are available to provide for timely simulation.

The simulation management component 432 provides the simulation results for the set of simulation experiments 306 that have been generated to the analysis component 422. The analysis component 422 synthesizes the simulation results to generate capacity planning analyses and recommendations for the PSP that are reviewable within the user interface provided by the user interface component 418. The capacity planning analyses and recommendation are thus viewable on the web browser program 426 running on the client computing device 412.

The simulation results of the simulation experiments 306 of FIG. 3 can include varying information for each simulation experiment 306 that has been run by the simulation component 434. This information can include the total cost and the per-job cost of the order(s) to which a simulation experiment 306 corresponds, as well as the length of time it takes to fulfill the job, revenue and profit the PSP incurs by fulfilling the order, and so on. From the simulation results for the set of simulation experiments 306 as a whole, the analysis component 422 can thus synthesize capacity planning and analyses recommendations for the printing equipment of the PSP as a whole, including existing equipment and planned or hypothetically procured such equipment. A user, such as a salesperson or representative for a printing equipment manufacturer or reseller, can therefore explain to a representative of the PSP how different purchases or leases of additional printing equipment can affect the profitability and equipment utilization of the PSP.

For example, the analysis component 422 can synthesize capacity planning and analyses recommendations by having preprogrammed queries corresponding to the synthesis and that may be used to construct an analysis graph. These queries are sent to the manager VM 437 of a cluster 436. The manager VM 437 executes each query systematically over the simulation scenarios by querying the database at the database VM 440 for each scenario. The results of these queries are sent back to the analysis component 422 through the manager VM 437, and the analysis component 422 plots the query results on an analysis graph as desired for a prescribed application context.

For the simulation results synthesis part 108 of the method 100 of FIG. 1, FIG. 5 shows an example graph 500 of capacity planning and analysis recommendations for a PSP that the can be generated and displayed. The graph 500 synthesizes the simulation results of the simulation experiments 306 of FIG. 3. In the example graph 500, the x-axis 502 denotes press utilization in percentage, whereas the y-axis 504 denotes hourly operating rate in dollars. The graph 500 includes two lines: a profit line 506 indicating profitability of the PSP as a function of press (i.e., printing equipment) utilization, and a late charges line 508 indicate late charges payable by the PSP to customers also as a function of press utilization.

Upon the salesperson or sales representative reviewing the graph 500 with the representative of the PSP, a decision may be made that a desirable operating zone 510, corresponding to recommended operating conditions, should be achieved. The zone 510, between 40% and 60% press utilization, may be determined by the salesperson and the PSP representative, may be a good balance between profitability and paying out late charges to customers, which can impact customer satisfaction. Once this zone 510 has been identified, the salesperson can drill down to identify the simulation experiments that the zone 510 encompasses. From these simulation experiments, the salesperson can identify what additional printing equipment the PSP should plan on purchasing in order to operate within the zone 510, so that proper planning capacity decisions can be made on the part of the PSP.

The techniques disclosed herein thus permit even smaller PSPs to have perform precise planning analysis performed for them. Rather than require a team of consultants, a salesperson or sales representative can interview a representative of a PSP and in short order acquire the interview data on which basis relevant simulation experiments can be run to generate relevant planning capacity decisions and recommendations. The techniques disclosed herein do not require customization on a per-PSP basis. Rather, the same underlying simulation architecture can be employed for a variety of different PSPs. This is achieved by the translating the interview data into simulation experiments that existing and other simulation engines can easily execute. Furthermore, by appropriately instantiating clusters and instantiating VM pairs within those clusters, a massively parallel backend cluster of simulation computing devices can be leveraged to quickly perform these simulations so that planning capacity analyses and recommendations can be formulated in the same visit of a PSP in which the initial interview data is acquired.

We claim:

1. A method comprising:
   providing, by a computing device, a user interface guiding an interview of a print service provider (PSP), which generates interview data regarding the PSP;
   translating, by the computing device, the interview data regarding the PSP into a plurality of simulation experiments, the simulation experiments regarding printing production services offerable by the PSP;
   causing, by the computing device, concurrent execution of the simulation experiments and responsively receiving simulation results, by instantiating a simulation cluster corresponding to the PSP, and by instantiating within the simulation cluster a pair of virtual machines (VMs) for each simulation experiment including a simulation VM running a simulation engine that executes the simulation experiment of the pair and a database VM that stores information regarding the simulation experiment of the pair; and
   synthesizing, by the computing device, the simulation results, which generates capacity planning analyses and recommendations for the PSP reviewable within the user interface,
   wherein the simulation cluster is one of a plurality of given simulation clusters, each given simulation cluster corresponds to a different PSP, and each given simulation cluster has a plurality of VMs, including a simulation VM and a database VM for each simulation experiment of the different PSP, and one manager VM that manages the simulation VMs and the database VMs for simulation experiments of the different PSP.

2. The method of claim 1, wherein the interview data comprises a minimal amount of information that is sufficient to ensure the capacity planning analyses and recommendations are accurate for the PSP.

3. The method of claim 1, wherein the interview data comprises one or more of:
   printing production plans regarding the PSP;
   current printing and related non-printing resources of the PSP;
   printing operating rules regarding the PSP;
   printing jobs that the PSP fulfills.

4. The method of claim 1, wherein the interview data comprises results of what-if analyses asked of the PSP to restrict one or more of a scope and a number of the simulation experiments that are to be simulated.

5. The method of claim 1, wherein translating the interview data into the simulation experiments comprises employing a generic translation process that is not specific to and that is not customized for the PSP but rather is generic to a plurality of PSPs including the PSP.

6. The method of claim 1, wherein translating the interview data into the simulation experiments comprises simultaneously handling concurrent processes of multiple printing jobs of varying types based on the interview data and dynamically and reconfigurably reworking those of the concurrent processes that fail.

7. The method of claim 1, wherein translating the interview data into the simulation experiments comprises:
   dividing a print job specified by the interview data into a plurality of tasks according to a production plan specified by the interview data, with priority according to one or more rules specified by the interview data; and
   dispatching the tasks over a plurality of resource pools into which resources specified by the interview data have been divided, according to the one or more rules specified by the interview data.

8. The method of claim 7, wherein dividing the print job comprises:
   prioritizing the print job according to the one or more rules to yield a priority of the print job;

dividing the print job into the tasks according to the production plan and the priority; and analyzing each task based on the operating plan to assign a unitless workload estimate thereto.

9. The method of claim 1, wherein causing the concurrent execution of the simulation experiments comprises, for each simulation experiment, as a given simulation experiment:

routing the given simulation experiment to a selected simulation engine of a plurality of simulation engines of the simulation cluster that communicates with a selected database of a plurality of databases of the simulation cluster to execute the simulation experiment;

receiving the simulation results for the given simulation experiment from the selected simulation engine.

10. The method of claim 9, wherein each simulation experiment is executed by the simulation VM and the database VM of the pair of VMs for the simulation experiment.

11. The method of claim 1, wherein causing the concurrent execution of the simulation experiments comprises routing the simulation experiments to a plurality of simulation engines of the simulation cluster in communication with a plurality of databases of the simulation cluster.

12. A system comprising:

a plurality of computing devices;

an interview component implemented by the computing devices that generates interview data regarding a print service provider (PSP) via a user interface;

a translation component implemented by the computing devices that translates the interview data into a plurality of simulation experiments; and a simulation component implemented by the computing devices that generates simulation results and that generates capacity planning analyses and recommendations for the PSP by concurrently running the simulation experiments, including instantiating a simulation cluster corresponding to the PSP, and instantiating within the simulation cluster a pair of virtual machines (VMs) for each simulation experiment including a simulation VM running a simulation engine that executes the simulation experiment of the pair and a database VM that stores information regarding the simulation experiment of the pair, wherein the simulation cluster is one of a plurality of given simulation clusters, each given simulation cluster corresponds to a different PSP, and each given simulation cluster has a plurality of VMs, including a simulation VM and a database VM for each simulation experiment of the different PSP, and one manager VM that manages the simulation VMs and the database VMs for simulation experiments of the different PSP.

13. The system of claim 12, wherein the computing devices comprise:

an interview server computing device to implement the interview component;

a translation server computing device to implement the translation component, the translation server computing device in communication with the interview server computing device to receive the interview data therefrom;

a plurality of simulation computing devices to implement the simulation component, the simulation computing devices in communication with the translation server computing device, the translation component to instantiate the simulation cluster to run on the simulation computing devices to run the simulation experiments as directed by the translation component, the cluster being a part of the simulation component.

14. The system of claim 13, wherein the cluster comprises a plurality of simulation virtual machine (VM)-database VM pairs, each simulation VM-database VM pair corresponding to and to run a corresponding simulation experiment, wherein the translation server is to instantiate one of the simulation VM-database VM pairs for each simulation experiment.

15. A non-transitory computer-readable data storage medium storing computer-executable code executable by a computing device to perform a method comprising:

guiding an interview of a print service provider (PSP) via a user interface that generates interview data regarding the PSP;

generating a plurality of simulation experiments based on the interview data, the simulation experiments regarding printing production services offerable by the PSP;

initiating concurrent execution of the simulation experiments, which causes generation of simulation results, by instantiating a simulation cluster corresponding to the PSP, and by instantiating within the simulation cluster a pair of virtual machines (VMs) for each simulation experiment including a simulation VM running a simulation engine that executes the simulation experiment of the pair and a database VM that stores information regarding the simulation experiment of the pair; and generating capacity planning analyses and recommendations for the PSP reviewable within the user interface, based on the simulation results, wherein the simulation cluster is one of a plurality of given simulation clusters, each given simulation cluster corresponds to a different PSP, and each given simulation cluster has a plurality of VMs, including a simulation VM and a database VM for each simulation experiment of the different PSP, and one manager VM that manages the simulation VMs and the database VMs for simulation experiments of the different PSP.

16. The method of claim 1, wherein causing the concurrent execution of the simulation experiments further includes instantiating a manager VM of the cluster that manages the pair of VMs for each simulation experiment.

* * * * *